United States Patent
Nakamura et al.

(10) Patent No.: US 11,817,571 B2
(45) Date of Patent: Nov. 14, 2023

(54) METHOD FOR PRODUCING AN ELECTRODE SHEET

(71) Applicant: Prime Planet Energy & Solutions, Inc., Tokyo (JP)

(72) Inventors: Kota Nakamura, Himeji (JP); Tomofumi Hirukawa, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/411,001

(22) Filed: Aug. 24, 2021

(65) Prior Publication Data

US 2022/0109137 A1    Apr. 7, 2022

(30) Foreign Application Priority Data

Oct. 2, 2020    (JP) ................... 2020-167653

(51) Int. Cl.
    *H01M 4/04*          (2006.01)

(52) U.S. Cl.
    CPC ........ *H01M 4/0435* (2013.01); *H01M 4/0404* (2013.01)

(58) Field of Classification Search
    CPC .... H01M 4/0435; H01M 4/0404; Y02E 60/10
    See application file for complete search history.

(56) References Cited

U.S. PATENT DOCUMENTS

| | | | | |
|---|---|---|---|---|
| 2016/0056420 A1* | 2/2016 | Jeong | .................... | H01M 4/661 29/623.5 |
| 2022/0140308 A1* | 5/2022 | Nishida | ................. | H01M 4/131 429/223 |

FOREIGN PATENT DOCUMENTS

| | | | |
|---|---|---|---|
| JP | 201442923 A | 3/2014 | |
| JP | 201590805 A | 5/2015 | |
| JP | 2015090805 A * | 5/2015 | |
| JP | 5760366 B2 | 8/2015 | |
| JP | 2017228349 A | 12/2017 | |
| JP | 2018063860 A | 4/2018 | |
| WO | WO-2020170543 A1 * | 8/2020 | .......... H01M 4/0435 |

OTHER PUBLICATIONS

JP-2015090805-A, machine translation, originally published 2015, p. 1-8 (Year: 2015).*

* cited by examiner

*Primary Examiner* — Katherine A Bareford
*Assistant Examiner* — Christina D McClure
(74) *Attorney, Agent, or Firm* — HAUPTMAN HAM, LLP

(57) ABSTRACT

A method for producing an electrode sheet includes a first feeding process, a roll press process, and a second feeding process, which are performed in this order. At least one of a first tension per unit area obtained by dividing a tension applied to the electrode sheet in a longitudinal direction in the first feeding process by a cross-sectional area of the electrode sheet being fed in the first feeding process and a second tension per unit area obtained by dividing a tension applied to the electrode sheet in a longitudinal direction in the second feeding process by a cross-sectional area of the electrode sheet being fed in the second feeding process is 5.0 MPa or less.

7 Claims, 5 Drawing Sheets

METHOD FOR PRODUCING AN ELECTRODE SHEET

CROSS-REFERENCE TO RELATED APPLICATIONS

This application is based upon and claims the benefit of priority to Japanese Patent Application No. 2020-167653 filed on Oct. 2, 2020, the entire contents of which are incorporated herein by reference.

BACKGROUND

Technical Field

The present disclosure relates to a method for producing an electrode sheet.

Related Art

Japanese unexamined patent application publication No. 2014-042923 discloses a method for producing an electrode sheet, the method including a first feeding process of feeding an electrode sheet, which extends in a longitudinal direction, in a feeding direction along the longitudinal direction to a pressing position at which the electrode sheet is roll-pressed by a pair of press rolls, a roll press process of roll-pressing the electrode sheet fed to the pressing position in the first feeding process so that the electrode sheet is roll-pressed in the longitudinal direction with a pair of press rolls, and a second feeding process of feeding the electrode sheet after being roll-pressed from the pressing position in the feeding direction. Those processes are performed in this order. In this producing method, while the electrode sheet is held in a form continuously extending in the longitudinal direction by passing through between the pair of press rolls from a start position of the first feeding process to an end position of the second feeding process, the electrode sheet is subjected to the roll press process.

As the electrode sheet, there has been known an electrode sheet including a strip-shaped mixture laminated part composed of a strip-shaped current collecting foil extending in a longitudinal direction and an electrode mixture layer laminated on the surface of the current collecting foil, and a strip-shaped mixture non-laminated part extending in the longitudinal direction and being located adjacent to the mixture laminated part in a width direction perpendicular to the longitudinal direction, the mixture non-laminated part including a part of the current collecting foil on which no electrode mixture layer is laminated. In the roll press process of roll-pressing the thus configured electrode sheet, the relatively thick mixture laminated part of the electrode sheet is roll-pressed in the longitudinal direction by the pair of press rolls. As a result, the mixture layer is compacted and the mixture laminated part is rolled out in the longitudinal direction. For this reason, in the roll press process, the mixture laminated part of the electrode sheet is elongated in the longitudinal direction, whereas the mixture non-laminated part is not elongated or is hardly elongated in the longitudinal direction. Thus, a difference in elongated amount, or length, i.e., a difference in elongation rate, occurs between the mixture laminated part and the mixture non-laminated part. This difference in elongated length (elongation rate) may cause wrinkles on the electrode sheet (e.g., the mixture non-laminated part).

SUMMARY

Technical Problems

Meanwhile, when the electrode sheet is applied with a large tension in the longitudinal direction in the first feeding process (referred to as the first tension) and a large tension in the longitudinal direction in the second feeding process (referred to as the second tension), the mixture laminated part rolled by roll press in the longitudinal direction in the roll press process (referred to as a rolled portion) is further elongated, resulting in a larger difference in elongation rate between the mixture laminated part and the mixture non-laminated part. Consequently, larger wrinkles may be generated on the electrode sheet. This defect is conceivably caused for the following reasons. Specifically, the large first tension and the large second tension are concentrated on the rolled portion, thereby stretching the rolled portion in the longitudinal direction. Accordingly, the rolled portion is elongated not only by rolling of roll press but also by this stretching, resulting in a large difference in elongation rate between the mixture laminated part and the mixture non-laminated part.

The present disclosure has been made to address the above problems and has a purpose to provide a method for producing an electrode sheet to reduce a difference in elongation rate between a mixture laminated part and a mixture non-laminated part.

Means of Solving the Problems

To achieve the above-mentioned purpose, one aspect of the present disclosure provides a method for producing an electrode sheet, the electrode sheet comprising: a strip-shaped mixture laminated part including a strip-shaped current collecting foil extending in a longitudinal direction and an electrode mixture layer laminated on a surface of the current collecting foil; and a strip-shaped mixture non-laminated part extending in the longitudinal direction and being located adjacent to the mixture laminated part in a width direction perpendicular to the longitudinal direction, the mixture non-laminated part including a part of the current collecting foil on which no electrode mixture layer is laminated, wherein the method comprises: firstly feeding the electrode sheet in a feeding direction along the longitudinal direction to a pressing position at which the mixture laminated part is roll-pressed by a pair of press rolls; roll-pressing the mixture laminated part of the electrode sheet fed to the pressing position in the firstly feeding so that the mixture laminated part is roll-pressed in the longitudinal direction by the pair of press rolls; and secondly feeding the electrode sheet after being roll-pressed from the pressing position in the feeding direction, the firstly feeding, the roll-pressing, and the secondly feeding are performed in this order, the electrode sheet is subjected to the roll pressing while the electrode sheet is held in a form continuously extending in the longitudinal direction by passing through between the pair of press rolls at least from a start position of the firstly feeding to an end position of the secondly feeding, and at least one of (i) a first tension per unit area that is a value obtained by dividing a tension applied to the electrode sheet in the longitudinal direction in the firstly feeding by a cross-sectional area of the electrode sheet being fed in the firstly feeding and (ii) a second tension per unit area that is a value obtained by dividing a tension applied to the electrode sheet in the longitudinal direction in the secondly feeding by a cross-sectional area of the electrode sheet being fed in the secondly feeding is equal to or less than 5.0 MPa.

In the foregoing producing method, at least one of a value of the first tension per unit area and a value of the second tension per unit area is set to be equal to or less than 5.0 MPa. The value of the first tension per unit area is obtained by dividing the tension applied to the electrode sheet in the longitudinal direction in the firstly feeding (referred to as a first tension) by a cross-sectional area of the electrode sheet that is being fed in the firstly feeding, i.e., a sectional area of a cut surface of the electrode sheet taken along the width direction perpendicular to the longitudinal direction. Further, the value of the second tension per unit area is obtained by dividing the tension applied to the electrode sheet in the longitudinal direction in the secondly feeding (referred to as a second tension) by a cross-sectional area of the electrode sheet that is being fed in the secondly feeding, i.e., a sectional area of a cut surface of the electrode sheet taken along the width direction perpendicular to the longitudinal direction.

With the foregoing configuration, the mixture laminated part rolled by roll press in the longitudinal direction in the roll-pressing (referred to as a rolled portion) can be reduced in the stretched amount, or length, of the mixture laminated part to be stretched in the longitudinal direction by the tension applied to the electrode sheet in the longitudinal direction in the firstly feeding (the first tension) and the tension applied to the electrode sheet in the longitudinal direction in the secondly feeding (the second tension). This configuration can reduce a difference in elongation rate between the mixture laminated part and the mixture non-laminated part in the roll pressing. It is therefore possible to reduce wrinkles which may occur on the electrode sheet (e.g., the mixture non-laminated part).

Further, in the foregoing producing method of the electrode sheet, at least one of the value of the first tension per unit area and the value of the second tension per unit area may be equal to or less than 2.4 MPa.

In the foregoing producing method, at least one of the value of the first tension per unit area and the value of the second tension per unit area is set to be equal to or less than 2.4 MPa. This configuration can further reduce the stretched length of the mixture laminated part to be stretched by the first tension and the second tension in the longitudinal direction while the mixture laminated part is rolled by roll press in the longitudinal direction. Accordingly, the difference in elongation rate between the mixture laminated part and the mixture non-laminated part in the roll-pressing can further be reduced.

Furthermore, in the producing method of the electrode sheet, both the value of the first tension per unit area and the value of the second tension per unit area may be equal to or less than 5.0 MPa.

In the foregoing producing method, both the value of the first tension per unit area and the value of the second tension per unit area are set to be equal to or less than 5.0 MPa. This configuration can extremely reduce the stretched length of the mixture laminated part to be stretched by the first tension and the second tension in the longitudinal direction while the mixture laminated part is rolled by roll press in the longitudinal direction. Accordingly, the difference in elongation rate between the mixture laminated part and the mixture non-laminated part in the roll press process can further be reduced.

Furthermore, in any one of the producing methods of the electrode sheet, both the value of the first tension per unit area and the value of the second tension per unit area may be equal to or less than 2.4 MPa.

In the above-described producing method, both the value of the first tension per unit area and the value of the second tension per unit area are set to be equal to or less than 2.4 MPa. This configuration can reduce the stretched length of the mixture laminated part (the rolled portion) to be stretched in the longitudinal direction by the first tension and the second tension to 0 (zero) while the mixture laminated part is rolled by roll press in the longitudinal direction. Specifically, in the roll-pressing, the elongated length of the rolled portion can be made equivalent to the elongated length resulting from only rolling of roll press. Thus, the foregoing method can further reduce a difference in elongation rate between the mixture laminated part and the mixture non-laminated part in the roll-pressing.

DETAILED DESCRIPTION OF THE EXEMPLARY EMBODIMENTS

Figure 1:
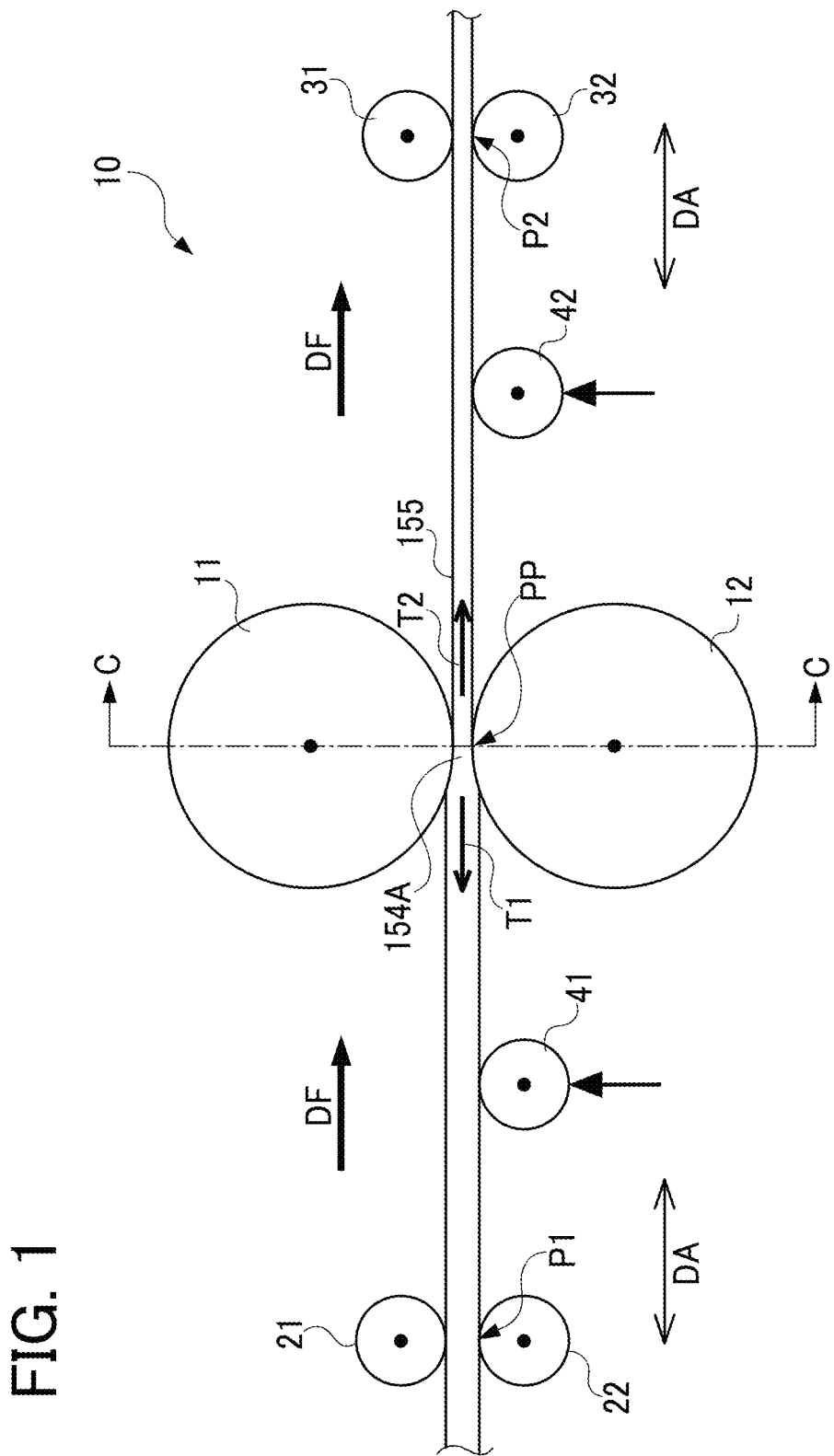
FIG. 1 is a schematic diagram of an apparatus for producing an electrode sheet in an embodiment.

A detailed description of an embodiment of a method for producing an electrode sheet will now be given referring to the accompanying drawings. In the present embodiment, a method for producing a positive electrode sheet 155 as the electrode sheet will be described. FIG. 1 is a schematic diagram of a producing apparatus 10 for producing an electrode sheet in the embodiment. This producing apparatus 10 includes a first pair of nip rolls 21 and 22, a first dancer roll 41, a pair of press rolls 11 and 12, a second dancer roll 42, and a second pair of nip rolls 31 and 32, which are arranged in this order from upstream to downstream (i.e., from left to right in FIG. 1) in a feeding direction DF of the positive electrode sheet 155. FIG. 1 shows only a section of the producing apparatus 10 to perform processes in steps S1 to S3 which will be described later.

Figure 2:
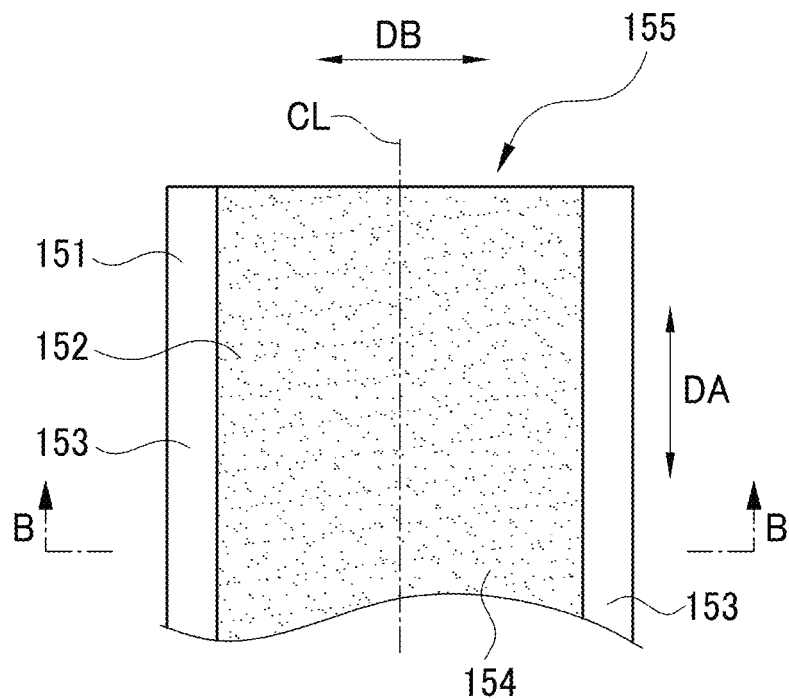
FIG. 2 is a plan view of the electrode sheet (a positive electrode sheet) in the embodiment.
Figure 3:
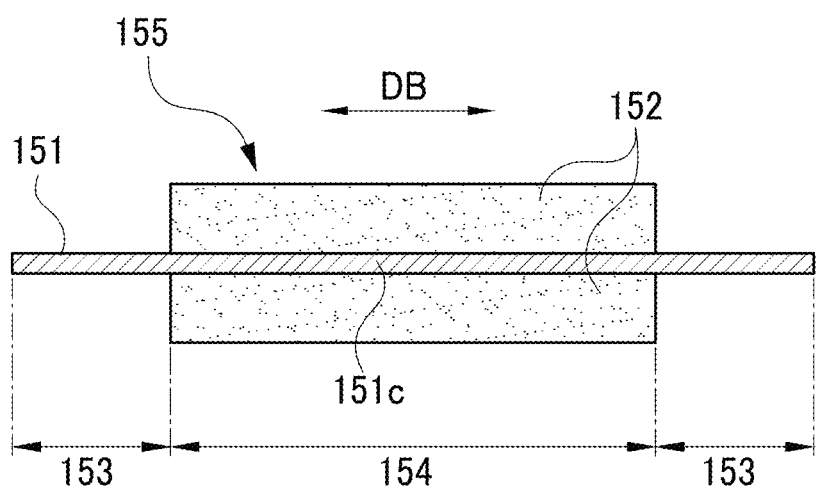
FIG. 3 is a cross-sectional view taken along a B-B line in FIG. 2.

The positive electrode sheet 155 includes a strip-shaped mixture laminated part 154 and a pair of strip-shaped mixture non-laminated parts 153 as shown in FIGS. 2 and 3. The mixture laminated part 154 includes a part of a strip-shaped current collecting foil 151 extending in a longitudinal direction DA and positive mixture layers 152 each laminated on one of the surfaces (both surfaces) of the foil 151. To be concrete, the mixture laminated part 154 includes a laminated collecting foil part 151c, which is a part of the strip-shaped current collecting foil 151, on which the positive mixture layers 152 are laminated, and the positive mixture layers 152. On the other hand, the pair of mixture non-laminated parts 153 correspond to parts of the current collecting foil 151 on which the positive mixture layers 152 are not laminated. Each mixture non-laminated part 153 extends in the longitudinal direction DA and is located adjacent to the mixture laminated part 154 on either side thereof in a width direction DB, i.e., in a perpendicular to the longitudinal direction DA. The current collecting foil 151 is made of a metal foil, concretely, an aluminum foil.

Figure 4:
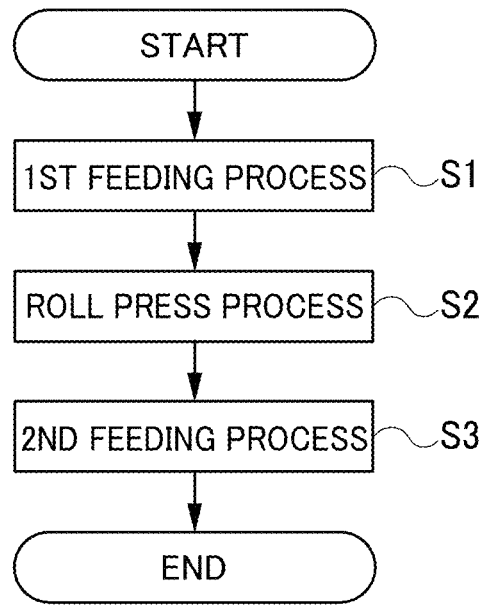
FIG. 4 is a flowchart showing a flow of a method for producing an electrode sheet in the embodiment.

The method for producing the electrode sheet will be described in detail below. Herein, the producing method for the positive electrode sheet 155 is described; however, a negative electrode sheet can also be produced in the same method. In the present embodiment, the producing apparatus 10 is configured to sequentially perform the processes in steps S1 to S3 shown in FIG. 4. In the producing apparatus 10, the positive electrode sheet 155 is fed in the feeding direction DF (corresponding to the longitudinal direction DA of the positive electrode sheet 155) by the first pair of nip rolls 21 and 22, the second pair of nip rolls 31 and 31, feeding rolls not shown, and others.

In step S1 (First feeding process), the positive electrode sheet 155 is fed in the feeding direction DF along the longitudinal direction DA to a pressing position PP at which the mixture laminated part 154 is roll-pressed by the pair of press rolls 11 and 12. Specifically, the positive electrode sheet 155 is delivered to the pressing position PP (see FIG. 1) from a first position P1 at which the positive electrode sheet 155 is nipped by the first pair of nip rolls 21 and 22.

Figure 5:
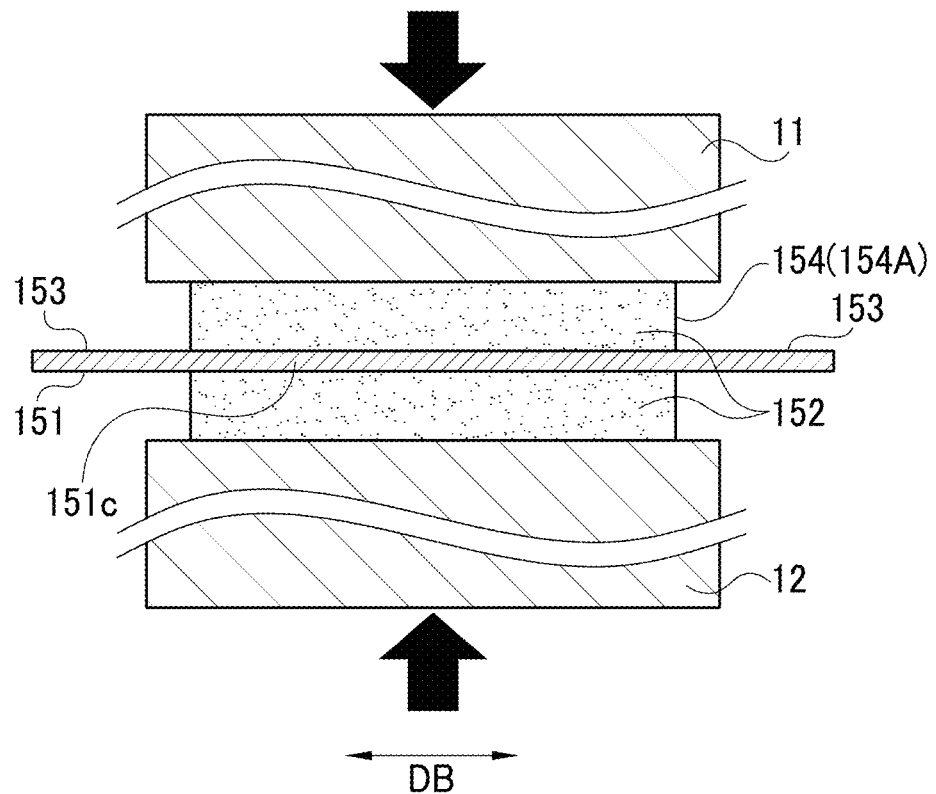
FIG. 5 is an explanatory view to show a roll press process in the embodiment.

In step S2 (Roll press step), successively, the mixture laminated part 154 of the positive electrode sheet 155 fed to the pressing position PP in step S1 (First feeding process) is roll-pressed in the longitudinal direction DA by the pair of press rolls 11 and 12 (see FIGS. 1 and 5). FIG. 5 is an explanatory view to show the roll press process in the present embodiment, corresponding a cross-sectional view taken along a line C-C in FIG. 1.

In step S2 (Roll press step), the positive mixture layers 152 (the electrode mixture layers) are compacted and also the mixture laminated part 154 is rolled in the longitudinal direction DA. In step S2 (Roll press step), therefore, the mixture laminated part 154 of the positive electrode sheet 155 is elongated in the longitudinal direction DA, whereas the mixture non-laminated parts 153 are not elongated or are hardly elongated in the longitudinal direction DA. This causes a difference in elongated length (i.e., elongation rate) between the mixture laminated part 154 and each mixture non-laminated part 153. If this difference in elongated length (elongation rate) is large, wrinkles may occur on the positive electrode sheet 155 (for example, the mixture non-laminated parts 153).

In step S3 (Second feeding process), the positive electrode sheet 155 after being subjected to step S2 (Roll press step) is then fed from the pressing position PP in the feeding direction DF. Specifically, the positive electrode sheet 155 is delivered from the pressing position PP to a second position P2 at which the positive electrode sheet 155 is nipped by the second pair of nip rolls 31 and 32 (see FIG. 1).

In the present embodiment, the roll press process is performed on the positive electrode sheet 155 held in a form continuously extending in the longitudinal direction DA while passing through between the pair of press rolls 11 and 12 at least from the first position P1 corresponding to the start position of the first feeding process (step S1) to the second position P2 corresponding to the end position of the second feeding process (step S2).

Specifically, the producing apparatus 10 includes an unwinding device (not shown) located upstream of the first pair of nip rolls 21 and 22 in the feeding direction DF and a winding device (not shown) located downstream of the second pair of nip rolls 31 and 32 in the feeding direction DF. The unwinding device is configured to unwind the positive electrode sheet 155 in the feeding direction DF from a roll of the positive electrode sheet 155 wound up in a roll form to perform the processes in steps S1 to S3. The winding device is configured to wind up the positive electrode sheet 155 after being subjected to the processes in steps S1 to S3. In the present embodiment, a single sheet (a single strip) of the positive electrode sheet 155 is set in the producing apparatus 10 so as to extend in the longitudinal direction DA from the unwinding device to the winding device without interruption. In the present embodiment, therefore, while the positive electrode sheet 155 is held in a form continuously extending in the longitudinal direction DA by passing through the pressing position PP between the pair of press rolls 11 and 12 at least from the first position P1 corresponding to the start position of the first feeding process (step S1) to the second position P2 corresponding to the end position of the second feeding process (step S2), the positive electrode sheet 155 is subjected to the roll press process.

Meanwhile, in step S2 (Roll press step) performed on the positive electrode sheet 155 held in the above-described state, when a large tension is applied to the positive electrode sheet 155 in the longitudinal direction DA in step S1 (First feeding process), which is assumed as a first tension T1, and a large tension is applied to the positive electrode sheet 155 in the longitudinal direction DA in step S3 (Second feeding process), which is assumed as a second tension T2, the mixture laminated part 154 rolled by roll press in the longitudinal direction DA, which is referred to as a rolled portion 154A, is more greatly elongated. Thus, a larger difference in elongation rate occurs between the mixture laminated part 154 and the mixture non-laminated parts 153. Consequently, such a larger difference in elongation rate may generate larger wrinkles on the positive electrode sheet 155.

The above-described defect is conceivably caused for the following reasons. Specifically, a large first tension T1 and a large second tension T2 concentrate on the rolled portion 154A, thereby causing the rolled portion 154A to be stretched in the longitudinal direction DA, so that the rolled portion 154A is greatly elongated not only by rolling of roll press but also by the stretching by those tensions T1 and T2. Thus, a large difference in elongation rate occurs between the mixture laminated part 154 and the mixture non-laminated parts 153.

In the present embodiment, in contrast, at least one of the value of the first tension per unit area and the value of the second tension per unit area is set to be equal to or less than 5.0 MPa. The value of the first tension per unit area is a value obtained by dividing a value of the tension (the first tension T1) applied to the positive electrode sheet 155 in the longitudinal direction DA in step S1 (First feeding process) by a cross-sectional area of the positive electrode sheet 155 that is being fed in step S1, i.e., a sectional area of a cut surface of the positive electrode sheet 155 taken along the width direction DB. The value of the second tension per unit area is a value obtained by dividing a value of the tension (the second tension T2) applied to the positive electrode sheet 155 in the longitudinal direction DA in step S3 (Second feeding process) by a cross-sectional area of the positive electrode sheet 155 that is being fed in step S3, i.e., a sectional area of a cut surface of the positive electrode sheet 155 taken along the width direction DB.

According to the above-described configuration, while the mixture laminated part 154 (the rolled portion 154A) is rolled by roll press in the longitudinal direction DA in step S2 (Roll press step), it is possible to reduce the stretched length of the mixture laminated part 154 (the rolled portion 154A) to be stretched by the first tension T1 and the second tension T2 in the longitudinal direction DA. Thus, a difference in elongation rate between the mixture laminated part 154 and each mixture non-laminated part 153 in step S2 (Roll press step) can be reduced, so that the positive electrode sheet 155 (for example, the mixture non-laminated parts 153) can be prevented from generating wrinkles.

In the producing apparatus 10 in the present embodiment, a value of the first tension T1 can be variously adjusted by changing the position of the first dancer roll 41, i.e., the position in a vertical direction in FIG. 1, thereby enabling to change the value of the first tension per unit area. Further, a value of the second tension T2 can be variously adjusted by changing the position of the second dancer roll 42, i.e., the position in the vertical direction in FIG. 1, thereby enabling to change the value of the second tension per unit area.

Furthermore, at least one of the value of the first tension per unit area and the value of the second tension per unit area may be set to be equal to or less than 2.4 MPa. Accordingly, while the mixture laminated part 154 is rolled by roll press in the longitudinal direction DA, the stretch length of the mixture laminated part 154 to be stretched by the first tension T1 and the second tension T2 in the longitudinal direction DA can be further reduced. It is therefore possible to reduce a difference in elongation rate between the mixture laminated part 154 and each mixture non-laminated part 153 in step S2 (Roll press step).

Further, both the value of the first tension per unit area and the value of the second tension per unit area may be set to be equal to or less than 5.0 MPa. Accordingly, while the mixture laminated part 154 is rolled by roll press in the longitudinal direction DA, the stretch length of the mixture laminated part 154 to be stretched by the first tension T1 and the second tension T2 can be reduced to an extremely small length. It is therefore possible to further reduce a difference in elongation rate between the mixture laminated part 154 and each mixture non-laminated part 153 in step S2 (Roll press step).

Still further, both the value of the first tension per unit area and the value of the second tension per unit area may be set to be equal to or less than 2.4 MPa. Accordingly, while the mixture laminated part 154 is rolled by roll press in the longitudinal direction DA, the stretch length of the mixture laminated part 154 (the rolled portion 154A) to be stretched in the longitudinal direction DA by the first tension T1 and the second tension T2 can be reduced to 0 (zero). Specifically, the elongated length of the rolled portion 154A in step S2 (Roll press step) can be made equivalent to the elongated length along caused by rolling of roll press. This can further reduce the difference in elongation rate between the mixture laminated part 154 and each mixture non-laminated part 153 in step S2 (Roll press step).

For example, the positive electrode sheet 155 produced as above is cut along the longitudinal direction DA at the center in the width direction and used as a positive electrode of a secondary battery. Specifically, this positive electrode and a negative electrode produced in the same manner as above are wound or laminated by interposing separators to produce an electrode body. This electrode body is housed in a battery case, and hence a secondary battery is produced.

<Comparative Test 1 of a Difference in Elongation Rate>

In a comparative test 1, values of the first tension per unit area U1 and values of the second tension per unit area U2 are combined in various combinations (U1, U2) and the processes in steps S1 to S3 are performed under each of those combinations (U1, U2) to compare a difference in elongation rate between the mixture laminated part 154 and the mixture non-laminated part 153 in step S2 (Roll press step). The values of the first tension per unit area U1 can be changed by changing the position of the first dancer roll 41 (the position thereof in a vertical direction in FIG. 1) to change the value of the first tension T1. The values of the second tension per unit area U2 can be changed by changing the position of the second dancer roll 42 (the position thereof in the vertical direction in FIG. 1) to change the value of the second tension T2.

This test is performed under the following conditions. Specifically, the press load of the pair of press rolls 11 and 12 in step S2 (Roll press step) is 4.0 [t/cm]. The press speed (the feeding speed of the positive electrode sheet 155) is 10 [m/min]. Further, the outer diameter of each of the paired press rolls 11 and 12 is 750 mm. The thickness of the mixture laminated part 154 before roll press is 180 μm and the thickness of the mixture laminated part 154 after roll press is 140 μm.

In this test 1, the values of the first tension per unit area U1 [MPa] and the values of second tension per unit area U2 [MPa] are combined in four types (U1, U2): (U1, U2)=(2.4, 2.4), (5.0, 5.0), (10.8, 10.8), and (16.5, 16.5). For each positive electrode sheet 155 having been subjected to the processes in steps S1 to S3 under one of the combinations (U1, U2), a difference in elongation rate between the mixture laminated part 154 and the mixture non-laminated part 153 is obtained after step S3.

Concretely, before step S1 to be performed under each combination (U1, U2), two lines extending straight in the width direction DB are drawn in advance on both the surface of the mixture laminated part 154 and the surface of the mixture non-laminated part 153 so that the two lines are spaced at a fixed distance in the longitudinal direction DA. After step S3, the distance between the two lines drawn on the surface of the mixture laminated part 154 and the distance between the two lines drawn on the surface of the mixture non-laminated part 153 are measured.

In each combination (U1, U2), based on a distance G1 between the two lines on the mixture non-laminated part 153 before being subjected to step S1 and a distance G2 between the two lines on the mixture non-laminated part 153 after being subjected to step S3, an elongation rate R1 of the mixture non-laminated part 153 is calculated by the following expression:

$$R1=\{(G2-G1)/G1\}\times 100[\%].$$

Furthermore, based on the distance G1 between the two lines on the mixture laminated part 154 before being subjected to step S1 and a distance G3 between the two lines on the mixture laminated part 154 after being subjected to step S3, an elongation rate R2 of the mixture laminated part 154 is calculated by the following expression:

$$R2=\{(G3-G1)/G1\}\times 100[\%].$$

Figure 6:
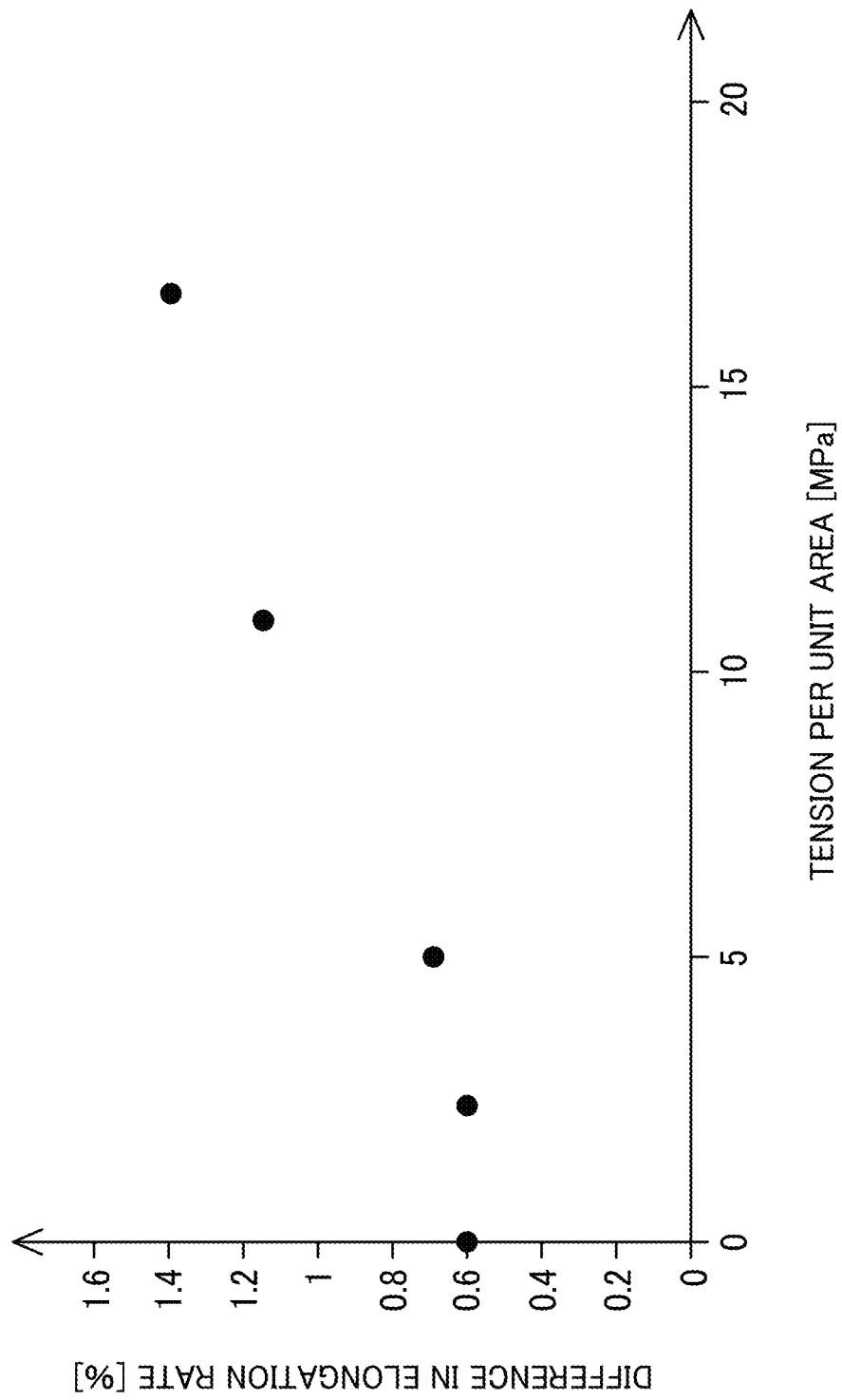
FIG. 6 is a graph showing a relationship between tension per unit area and elongation rate difference.

In each combination (U1, U2), based on the elongation rate R1 of the mixture non-laminated part 153 and the elongation rate R2 of the mixture laminated part 154 each calculated as above, a difference in elongation rate (=R2−R1) between the mixture laminated part 154 and the mixture non-laminated part 153 is calculated. Those results are shown in FIG. 6. The lateral axis of FIG. 6 indicates a "tension per unit area" corresponding to values of the first tension per unit area U1 and values of the second tension per unit area U2. In this test, the values U1 and U2 are equal in any combination (U1, U2) and thus the values U1 and U2 in FIG. 6 are simply referred to as a "tension per unit area" without distinction.

In FIG. 6, further, a difference in elongation rate (R2−R1) when the roll press process is performed on one combination: (U1, U2)=(0, 0) is indicated as a reference value. The roll press process under the combination: (U1, U2)=(0, 0) is performed in the following manner. Specifically, a long positive electrode sheet 155 extending in the longitudinal direction DA is cut along the width direction DB, forming a rectangular positive electrode sheet 155. This short reed-shaped positive electrode sheet 155 applied with no tension is passed through between the pair of press rolls 11 and 12 and therein roll-pressed. In this roll press process, the rolled portion 154A is not stretched by the first tension T1 and the second tension T2, so that the elongated length of the rolled portion 154A corresponds to an elongated length caused only by rolling of roll press.

As shown in FIG. 6, when the values of tension per unit area (that is, the value of the first tension per unit area U1 and the value of the second tension per unit area U2) are set to equal to or less than 5.0 MPa, the difference in elongation rate is little different from that when the tension per unit area is 0. In contrast, when the values of tension per unit area are set to larger than 5.0 MPa, the difference in elongation rate drastically increases.

This result reveals that it is better to set the value of the first tension per unit area U1 and the value of the second tension per unit area U2 to be equal to or less than 5.0 MPa. This is because this setting enables to reduce the stretched length of the mixture laminated part 154 (the rolled portion 154A) to be stretched by the first tension T1 and the second tension T2 in the longitudinal direction DA to an extremely small amount while the mixture laminated part 154 (the rolled portion 154A) is rolled by roll press in the longitudinal direction DA. Thus, a difference in elongation rate between the mixture laminated part 154 and the mixture non-laminated part 153 can be reduced in step S2 (Roll press step).

Furthermore, as shown in FIG. 6, when the values of tension per unit area (that is, the value of the first tension per unit area U1 and the value of the second tension per unit area U2) are set to be equal to or less than 2.4 MPa, a difference in elongation rate is equal to that when the tension per unit area is 0.

This result reveals that it is more preferable to set both the value of the first tension per unit area U1 and the value of the second tension per unit area U2 to be equal to or less than 2.4 MPa. This is because this setting enables to reduce the stretched length of the mixture laminated part 154 (the rolled portion 154A) to be stretched by the first tension T1 and the second tension T2 in the longitudinal direction DA to 0 (zero) while the mixture laminated part 154 (the rolled portion 154A) is rolled by roll press in the longitudinal direction DA, specifically, because the elongated length of the rolled portion 154A in step S2 (Roll press step) can be made equal to the elongated length caused only by rolling of roll press. Thus, a difference in elongation rate between the mixture laminated part 154 and the mixture non-laminated part 153 in step S2 (Roll press step) can be further reduced.

<Comparative Test 2 of a Difference in Elongation Rate>

In a comparative test 2, values of the first tension per unit area U1 and values of the second tension per unit area U2 are combined in various combinations (U1, U2) and the processes in steps S1 to S3 are performed under each of those combinations (U1, U2) to compare a difference in elongation rate between the mixture laminated part 154 and the mixture non-laminated part 153 in step S2 (Roll press step).

In this test 2, the values of the first tension per unit area U1 [MPa] and the values of the second tension per unit area U2 [MPa] are combined in three types (U1, U2): (U1, U2)=(10.8, 10.8), (2.4, 10.8), and (10.8, 2.4). For each positive electrode sheet 155 having been subjected to the processes in steps S1 to S3 under one of the combinations (U1, U2), a difference in elongation rate between the mixture laminated part 154 and the mixture non-laminated part 153 is obtained after step S3 in a similar manner to the test 1. These results are shown in FIG. 7.

Figure 7:
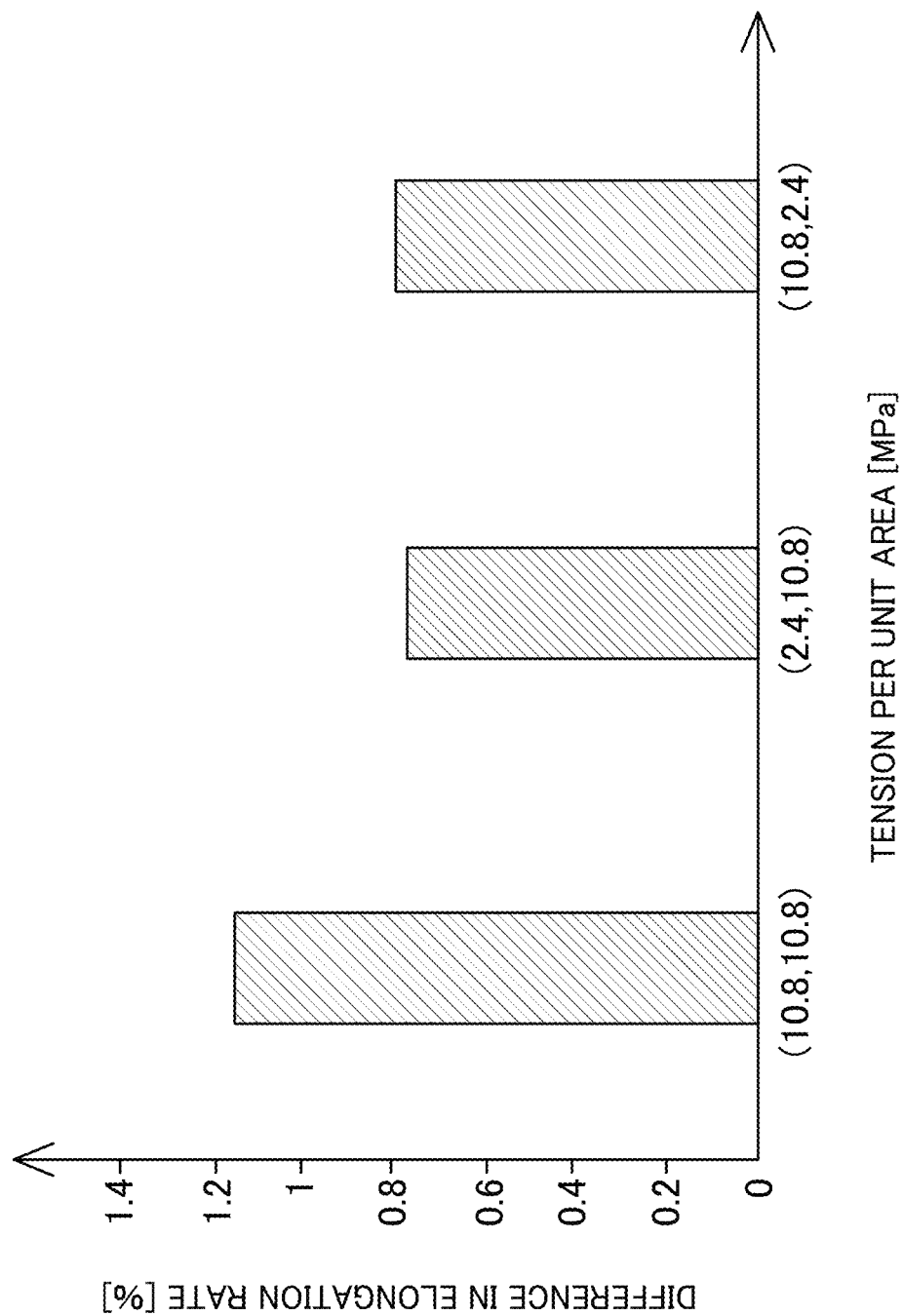
FIG. 7 is another graph showing a relationship between tension per unit area and elongation rate difference.

When the combination (U1, U2) is (2.4, 10.8) or (10.8, 2.4), as shown in FIG. 7, the difference in elongation rate between the mixture laminated part 154 and the mixture non-laminated part 153 is smaller than that when the combination is (10.8, 10.8). Specifically, when the combination (U1, U2) is (10.8, 10.8), the difference in elongation rate is about 1.2%, whereas the combination (U1, U2) is (2.4, 10.8) or (10.8, 2.4), the difference in elongation rate is as small as 0.8% or less. These results reveal that, as long as either value of the first tension per unit area U1 or the second tension per unit area U2 is reduced instead of both being reduced to the same value, it is possible to reduce a difference in elongation rate between the mixture laminated part 154 and the mixture non-laminated part 153.

In light of the results of the above-described tests 1 and 2, consequently, when at least one of the value of the first tension per unit area U1 and the value of the second tension per unit area U2 is 5.0 MPa or less, the difference in elongation rate between the mixture laminated part 154 and the mixture non-laminated part 153 can be reduced. Furthermore, when at least one of the value of the first tension per unit area U1 and the value of the second tension per unit area U2 is 2.4 MPa or less, the difference in elongation rate between the mixture laminated part 154 and the mixture non-laminated part 153 can be further reduced.

The foregoing embodiments are mere examples and give no limitation to the present disclosure. The present disclosure may be embodied in other specific forms without departing from the essential characteristics thereof.

REFERENCE SIGNS LIST

10 Producing apparatus
11, 12 Press roll
41, 42 Dancer roll
151 Current collecting foil
151c Laminated collecting foil part
152 Positive mixture layer (Electrode mixture layer)
153 Mixture non-laminated part
154 Mixture laminated part
154A Rolled portion
155 Positive electrode sheet (Electrode sheet)
DA Longitudinal direction
DB Width direction
DF Feeding direction
PP Pressing position
T1 First tension
T2 Second tension

What is claimed is:
1. A method for producing an electrode sheet, the electrode sheet comprising:
a strip-shaped mixture laminated part including a strip-shaped current collecting foil extending in a longitudinal direction and an electrode mixture layer laminated on a surface of the current collecting foil; and a strip-shaped mixture non-laminated part extending in the longitudinal direction and being located adjacent to the mixture laminated part in a width direction perpendicular to the longitudinal direction, the mixture non-laminated part including a part of the current collecting foil on which no electrode mixture layer is laminated, wherein the method comprises:

firstly feeding, using a first pair of nip rollers, the electrode sheet in a feeding direction along the longitudinal direction to a pressing position at which the mixture laminated part is roll-pressed by a pair of press rolls;

roll-pressing the mixture laminated part of the electrode sheet fed to the pressing position in the firstly feeding so that the mixture laminated part is roll-pressed in the longitudinal direction by the pair of press rolls; and secondly feeding, using a second pair of nip rollers, the electrode sheet after being roll-pressed from the pressing position in the feeding direction, the firstly feeding, the roll-pressing, and the secondly feeding are performed in this order, the electrode sheet is subjected to the roll pressing while the electrode sheet is held in a form continuously extending in the longitudinal direction by passing through between the pair of press rolls at least from a start position of the firstly feeding to an end position of the secondly feeding, and each of (i) a value of a first tension per unit area that is a value obtained by dividing a tension applied to the electrode sheet in the longitudinal direction in the firstly feeding by a cross-sectional area of the electrode sheet being fed in the firstly feeding and (ii) a value of a second tension per unit area that is a value obtained by dividing a tension applied to the electrode sheet in the longitudinal direction in the secondly feeding by a cross-sectional area of the electrode sheet being fed in the secondly feeding is equal to or less than 2.4 MPa, and wherein the first tension per unit area is equal to the second tension per unit area.

2. A method for producing an electrode sheet, the electrode sheet comprising:

a strip-shaped mixture laminated part including a strip-shaped current collecting foil extending in a longitudinal direction and an electrode mixture layer laminated on a surface of the current collecting foil; and a strip-shaped mixture non-laminated part extending in the longitudinal direction and being located adjacent to the mixture laminated part in a width direction perpendicular to the longitudinal direction, the mixture non-laminated part including a part of the current collecting foil on which no electrode mixture layer is laminated, wherein the method comprises:

firstly feeding the electrode sheet in a feeding direction along the longitudinal direction to a pressing position at which the mixture laminated part is roll-pressed by a pair of press rolls;

roll-pressing the mixture laminated part of the electrode sheet fed to the pressing position in the firstly feeding so that the mixture laminated part is roll-pressed in the longitudinal direction by the pair of press rolls; and secondly feeding the electrode sheet after being roll-pressed from the pressing position in the feeding direction, the firstly feeding, the roll-pressing, and the secondly feeding are performed in this order, the electrode sheet is subjected to the roll pressing while the electrode sheet is held in a form continuously extending in the longitudinal direction by passing through between the pair of press rolls at least from a start position of the firstly feeding to an end position of the secondly feeding, and a value of a first tension per unit area, obtained by dividing a tension applied to the electrode sheet in the longitudinal direction in the firstly feeding by a cross-sectional area of the electrode sheet being fed in the firstly feeding, and a value of a second tension per unit area, obtained by dividing a tension applied to the electrode sheet in the longitudinal direction in the secondly feeding by a cross-sectional area of the electrode sheet being fed in the secondly feeding, are equal to or less than 2.4 MPa, and wherein the first tension per unit area is equal to the second tension per unit area.

3. The method for producing an electrode sheet according to claim 2, wherein the firstly feeding comprises firstly feeding using a pair of nip rollers.

4. The method for producing an electrode sheet according to claim 2, wherein the secondly feeding comprises secondly feeding using a pair of nip rollers.

5. A method for producing an electrode sheet, the electrode sheet comprising:

a strip-shaped mixture laminated part including a strip-shaped current collecting foil extending in a longitudinal direction and an electrode mixture layer laminated on a surface of the current collecting foil; and a strip-shaped mixture non-laminated part extending in the longitudinal direction and being located adjacent to the mixture laminated part in a width direction perpendicular to the longitudinal direction, the mixture non-laminated part including a part of the current collecting foil on which no electrode mixture layer is laminated, wherein the method comprises:

firstly feeding the electrode sheet in a feeding direction along the longitudinal direction to a pressing position at which the mixture laminated part is roll-pressed by a pair of press rolls;

roll-pressing the mixture laminated part of the electrode sheet, without contacting the non-laminated part, fed to the pressing position in the firstly feeding so that the mixture laminated part is roll-pressed in the longitudinal direction by the pair of press rolls; and secondly feeding the electrode sheet after being roll-pressed from the pressing position in the feeding direction, the firstly feeding, the roll-pressing, and the secondly feeding are performed in this order, the electrode sheet is subjected to the roll pressing while the electrode sheet is held in a form continuously extending in the longitudinal direction by passing through between the pair of press rolls at least from a start position of the firstly feeding to an end position of the secondly feeding, and each of (i) a first tension per unit area that is a value obtained by dividing a tension applied to the electrode sheet in the longitudinal direction in the firstly feeding by a cross-sectional area of the electrode sheet being fed in the firstly feeding and (ii) a second tension per unit area that is a value obtained by dividing a tension applied to the electrode sheet in the longitudinal direction in the secondly feeding by a cross-sectional area of the electrode sheet being fed in the secondly feeding is equal to or less than 2.4 MPa, and wherein the first tension per unit area is equal to the second tension per unit area.

6. The method for producing an electrode sheet according to claim 5, wherein the firstly feeding comprises firstly feeding using a pair of nip rollers.

7. The method for producing an electrode sheet according to claim 5, wherein the secondly feeding comprises secondly feeding using a pair of nip rollers.

* * * * *